June 15, 1954     L. F. POMRENKE     2,680,878
FISH HOLDER
Filed May 15, 1952
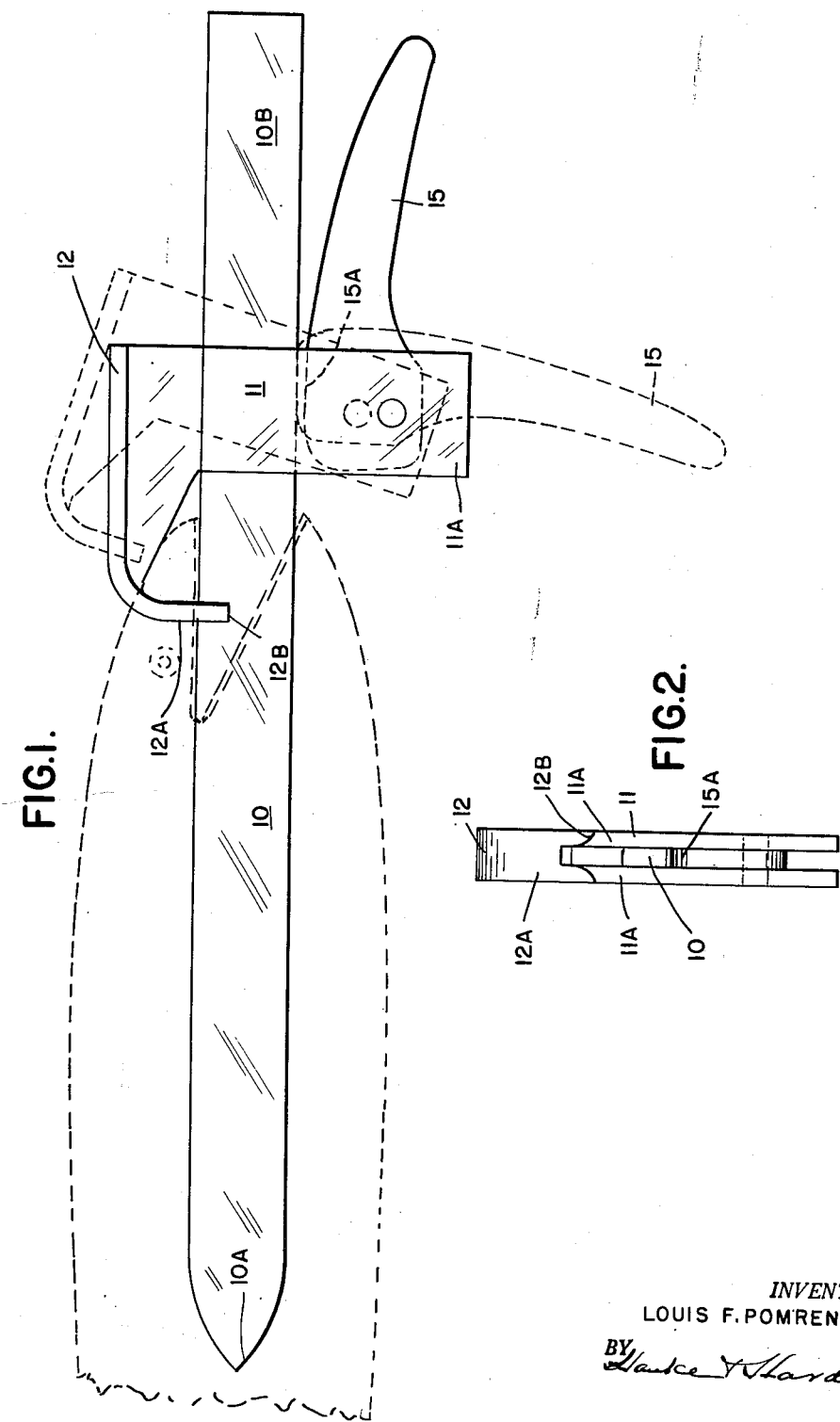
*INVENTOR.*
LOUIS F. POMRENKE
BY *Hance & Hardesty*
ATTORNEYS Patented June 15, 1954

2,680,878

UNITED STATES PATENT OFFICE 2,680,878

FISH HOLDER

Louis F. Pomrenke, Trenton, Mich., assignor of one-half to Arthur I. Nickel, Trenton, Mich.

Application May 15, 1952, Serial No. 287,845

1 Claim. (Cl. 17—8)

The present invention relates to devices for holding fish for the purpose of scaling or skinning as the case may be.

Among the objects of the invention is to provide a holder that is readily adjustable for the size of fish to be cleaned.

Another object is to provide a holder that positively grips the fish by means of an element that penetrates the bony structure of the fish head.

Another object is a holder that maintains the fish in a substantially rigid condition.

Still other objects and advantages will readily occur to those skilled in the art upon reference to the following specification and drawing in which Fig. 1 is a side elevation of the device indicating its manner of use.

Fig. 2 is an end elevation.

In the drawing the device is shown as consisting of a narrow elongated metal blade 10 substantially rectangular in section and having one end 10A pointed. The blade 10 will be uniform in size throughout its length with its corners rounded so that the rear end 10B may serve as a handle.

Loosely carried on the blade 10 is a slide 11 consisting of parallel metal plates 11A spaced to receive between them the blade 10.

The plates 11A are fixed at one end to a claw element 12, consisting of narrow strip suitable metal extending over the ends of plates 1A, bent down at one end 12A, and bifurcated as at 12B so as to receive the edge of blade 10 when in clamping or fish holding position. The ends of the bifurcated portion are sharpened as shown clearly in Fig. 2.

Pivoted between the plates 11A near their lower ends (as viewed in Fig. 1) is a lever 15 so shaped as to form a cam portion 15A at one end and on the side adjacent the blade 10.

In Fig. 1 is indicated the operation of the device and in this figure, the blade 10 is indicated as being thrust through the fish's mouth into his gullet or body cavity. This operation is performed with the slide 11 and lever 15 in the dotted line position. When the lever 15 is moved to the full line position, the cam 15A swings the slide forward and downward so that the points 12B penetrate the head of the fish and hold it securely.

Now having described the invention and the preferred embodiment thereof, it is to be understood that said invention is to be limited, not to the specific details herein set forth, but only by the scope of the claim which follows:

I claim:

A fish holder consisting of a narrow elongated blade, a slide member loosely carried thereon, said slide member comprising a pair of substantially rectangular plates of a length greater than the width of said blade, a claw member fixed to said plates at one end and serving to fix said plates in spaced relation, said claw member extending beyond the edges of said plates and being turned toward said blade and having its end bifurcated with the branches pointed, a cam rotatably mounted between said plates near the end opposite said claw member, said cam being so arranged that when its "low" side is adjacent said blade, said claw member may be spaced from the blade and when its "high" side is adjacent said blade, the bifurcated end of the claw member straddles the blade, and a lever for rotating said cam.

References Cited in the file of this patent

UNITED STATES PATENTS

| Number | Name | Date |
|---|---|---|
| 1,259,109 | Kugler et al. | Mar. 12, 1918 |
| 2,511,592 | Krafczyk | June 13, 1950 |
| 2,587,007 | Southward et al. | Feb. 26, 1952 |
| 2,603,829 | Siskoff | July 22, 1952 |

FOREIGN PATENTS

| Number | Country | Date |
|---|---|---|
| 45,794 | Sweden | Sept. 20, 1919 |